No. 773,439.                                              Patented October 25, 1904.

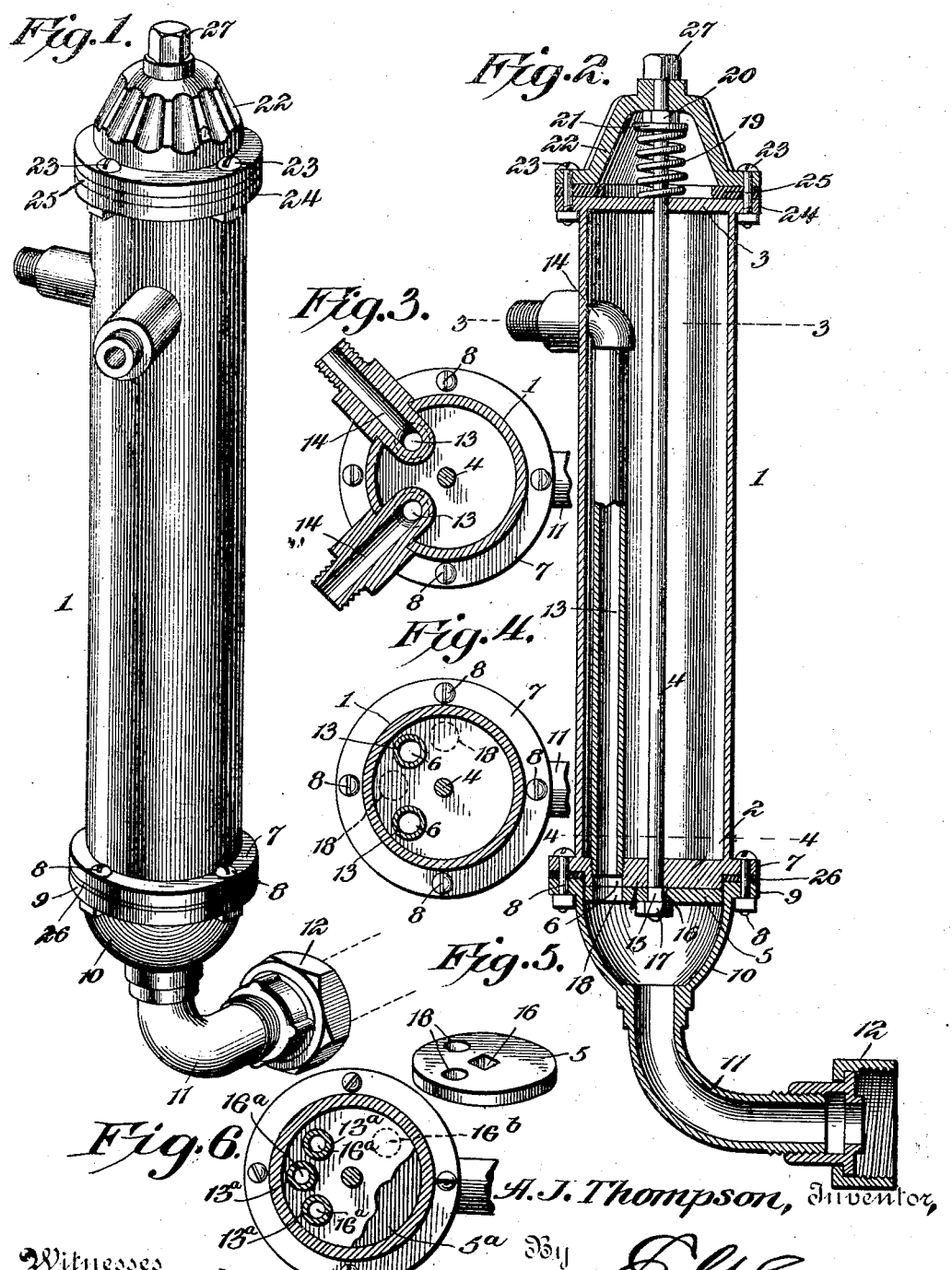

UNITED STATES PATENT OFFICE.

ARTHUR J. THOMPSON, OF KOKOMO, INDIANA.

HYDRANT.

SPECIFICATION forming part of Letters Patent No. 773,439, dated October 25, 1904.

Application filed July 1, 1903. Serial No. 163,955. (No model.)

*To all whom it may concern:*

Be it known that I, ARTHUR J. THOMPSON, a citizen of the United States, residing at Kokomo, in the county of Howard and State of Indiana, have invented a new and useful Hydrant, of which the following is a specification.

The invention relates to improvements in hydrants.

The object of the present invention is to improve the construction of hydrants, and to provide a simple and comparatively inexpensive one designed to be connected with an ordinary service-pipe and provided with a plurality of nozzles adapted each to receive a hose for the discharge of water.

A further object of the invention is to provide a hydrant of this character adapted should one hose burst or otherwise become inoperative to enable the flow of water to the same to be readily cut off, whereby the defective hose may be removed and replaced by a new hose without interfering with the flow of water through the other nozzle or nozzles.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a hydrant constructed in accordance with this invention. Fig. 2 is a longitudinal sectional view of the same. Fig. 3 is a horizontal sectional view on the line 3 3 of Fig. 2. Fig. 4 is a similar view on the line 4 4 of Fig. 2. Fig. 5 is a detail view of the valve. Fig. 6 is a horizontal sectional view of a hydrant having three discharge-pipes.

Like numerals of reference designate corresponding parts in all the figures of the drawings.

1 designates a cylindrical casing having a bottom 2 and a top 3, which are pierced by a longitudinal valve-stem 4, provided at its lower end with a rotary valve 5, arranged to cover and uncover eccentric openings 6 of the bottom 2 of the casing. The casing is provided at its lower end with an outwardly-extending annular flange 7, which is perforated for the reception of bolts 8 or other suitable fastening devices, which pass through similar perforations of a flange 9 of a cap 10. The cap or hollow end piece 10, which is arranged at the lower end of the casing, is suitably connected with an L-shaped pipe or elbow 11, which is provided with a coupling 12 for enabling it to be connected with a service-pipe. The coupling is designed to be provided with a suitable strainer (not shown) for preventing the hydrant from becoming clogged.

The bottom 2, which forms a valve-seat, is provided with the apertures 6, which may be of any desired number, either two or more, and these apertures receive the lower ends of discharge-pipes 13, arranged within the casing and extending upward from the valve-seat and provided at their upper ends with arms or elbows 14, which pierce the casing of the hydrant and form discharge-nozzles. The discharge-nozzles are threaded for the reception of hose-couplings. By this construction several lines of hose may be connected with the hydrant, and in event of one bursting and otherwise becoming defective the same may be removed or repaired without interfering with the flow of water through the other hose. When more than two discharge-pipes 13 are employed, the valve will be provided with a special arrangement of apertures for enabling an intermediate discharge-pipe to be cut out.

The valve 4 consists of a disk which fits against the lower face of the bottom or valve-seat 2, and the contiguous faces of the valve and the valve-seat are designed to be ground to obviate the necessity of employing packing or washers, and the pressure of the water on the lower face of the valve will operate to force the same against the seat. The lower end of the valve-stem is squared at 15 to fit a squared opening 16 of the valve, and it is threaded beyond the squared portion to receive a nut 17; but the valve may be connected with the valve-stem in any other desired manner. The valve-seat or bottom 2 is provided with a central circular opening for the valve-stem, which is round thereat to form a bearing. The valve is provided with apertures 18, which are adapted to be carried by the rotary movement of the valve-stem into and out of register with the apertures of the valve-seat to cover or uncover either one or both of the apertures 6. The top 3 of the casing 1 is provided with a central perforation to receive the valve-stem, and it is engaged by a coiled spring 19, interposed between the top 3 and an adjustable device of the valve-stem. The adjustable device preferably consists of a nut 20 and a washer 21, the nut being adapted to be adjusted to vary the tension of the spring. The spring is located beyond the top of the casing, and it is covered by a cap or upper end 22, secured by bolts 23 to an outwardly-extending annular flange 24 of the casing. The upper cap or hollow end 22 is provided with an outwardly-extending annular flange, and the bolts 23 pass through these flanges. Suitable packings 25 and 26 are interposed between the upper and lower caps or ends and the cylindrical casing. The valve-stem is provided at its upper end with a suitable head 27, adapted to receive a wrench or key for adjusting the valve, and any suitable means may be provided for indicating the several positions of the valve to cover and uncover one or both of the apertures. The top and bottom may be brazed or otherwise secured to the casing, and the longitudinal discharge-tubes, which extend through the casing, are applied in position when the casing is constructed, and they may be secured to the same in any desired manner.

In Fig. 6 of the drawings is illustrated the construction for cutting out the intermediate discharge-pipe. The discharge-pipes 13$^a$ are located at one side of the hydrant, and the rotary valve 5$^a$ is provided with apertures 16$^a$ and 16$^b$. When the apertures 16$^a$ are brought into register with the discharge-pipes 13$^a$, water will flow through each of the pipes. Should it be desired to cut out the intermediate pipe, the valve is rotated to bring the aperture 16$^b$ and the adjacent end aperture 16$^a$ into register with the end discharge-pipes. The intermediate solid portion of the valve will cut off the flow to the intermediate discharge-pipe. Either of the end discharge-pipes may be cut out by bringing a solid portion of the valve beneath such pipes.

It will be seen that the hydrant is exceedingly simple and inexpensive in construction, that it is provided with a plurality of discharge-nozzles, and that it is adapted to control the flow of water through the same, whereby one or more lines of hose may be operated.

Having thus fully described my invention, what I claim as new, and desire to secure by Letters Patent, is—

1. A hydrant comprising a casing provided at its bottom with a valve-seat having a plurality of apertures, a plurality of discharge-pipes located within the casing and extending from the said apertures and piercing the casing above the valve-seat to provide nozzles, and an exteriorly-operable valve for controlling the flow of water through the apertures of the valve-seat whereby one or more of the discharge-pipes may be cut out, substantially as described.

2. A hydrant comprising a casing provided with a valve-seat having a plurality of apertures, a plurality of discharge-pipes located within the casing and extending from the apertures, a valve for controlling the flow of water through the discharge-pipes whereby one or more of the pipes may be cut out, and exteriorly-arranged nozzles communicating with the pipes, substantially as described.

3. A hydrant comprising a casing provided with a valve-seat having a plurality of apertures, a plurality of discharge-tubes extending upward from the apertures, and an exteriorly-operable valve arranged to cover and uncover the said apertures whereby one or more of the pipes may be cut out, substantially as described.

4. A hydrant comprising a casing provided with a valve-seat having a plurality of apertures and located at the bottom of the casing, a plurality of discharge-tubes communicating with the apertures and extending upward from the apertures of the valve-seat and piercing the casing above the same, a valve arranged on the valve-seat adapted to cut out one or more of the discharge-tubes, and a valve-stem connected with the valve and extending through the casing and provided with means for operating it from the exterior, substantially as described.

5. A hydrant comprising a casing provided at the bottom with a valve-seat having a plurality of apertures, a plurality of discharge-tubes located within the casing and extending upward from the apertures and terminating in independent discharge-nozzles, a valve arranged on the lower face of the valve-seat and adapted to cover and uncover the said apertures whereby one or more of the tubes may be cut out, a valve-stem extending through the casing and provided above the top thereof with a spring, a cap arranged on the top of the casing and covering the spring, and means for operating the valve-stem from the exterior of the casing, substantially as described.

6. A hydrant, comprising a casing provided at the bottom with a valve-seat having a plurality of apertures, a plurality of discharge-pipes located within the casing and extending upward from the apertures of the valve-seat, and an exteriorly-operable valve provided with means for cutting out either the end or intermediate discharge-pipes, or both, substantially as described.

In testimony that I claim the foregoing as my own I have hereto affixed my signature in the presence of two witnesses.

ARTHUR J. THOMPSON.

Witnesses:
   H. L. MORELAND,
   BEN L. O. TATE.